United States Patent
Heller et al.

(10) Patent No.: US 12,327,081 B2
(45) Date of Patent: *Jun. 10, 2025

(54) CROSS CHANNEL DIGITAL DATA ARCHIVING AND UTILIZATION SYSTEM

(71) Applicant: BANK OF AMERICA CORPORATION, Charlotte, NC (US)

(72) Inventors: Ryan Scott Heller, Middletown, DE (US); Charanjit S. Bagga, Thousand Oaks, CA (US); Muralidhar Chowdarapu, Simi Valley, CA (US); Burton M. Covnot, Carol Stream, IL (US); Indradeep Dantuluri, Harrisburg, NC (US); Sandeep Gandhi, Waxhaw, NC (US); Saurabh Khanna, Frisco, TX (US); Silvia Adriana Krasuk, Los Angeles, CA (US); Mardochee Macxis, Concord, NC (US); Walter Thomas Robinson, Charlotte, NC (US); Rupal V. Shah, Loomis, CA (US); Mansoor Zafar, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/880,903

(22) Filed: Aug. 4, 2022

(65) Prior Publication Data

US 2022/0382969 A1   Dec. 1, 2022

Related U.S. Application Data

(63) Continuation-in-part of application No. 17/540,617, filed on Dec. 2, 2021.

(Continued)

(51) Int. Cl.
*G06F 40/174* (2020.01)
*G06F 16/11* (2019.01)
(Continued)

(52) U.S. Cl.
CPC .......... *G06F 40/174* (2020.01); *G06F 16/113* (2019.01)

(58) Field of Classification Search
None
See application file for complete search history.

(56) References Cited

U.S. PATENT DOCUMENTS 5,794,205 A   8/1998 Walters et al.
6,345,278 B1 * 2/2002 Hitchcock ............. G06F 40/174
                                                  707/999.102

(Continued)

FOREIGN PATENT DOCUMENTS

WO   2017059500 A1   4/2017

*Primary Examiner* — Mustafa A Amin
(74) *Attorney, Agent, or Firm* — Moore & Van Allen PLLC; Nicholas C. Russell

(57) ABSTRACT

Embodiments of the invention are directed to a system, method, or computer program product for convenient, secure digital data archiving and utilization across multiple communication channels. The method includes extracting one or more data input fields from a form and generating one or more user prompts to be presented to a user in order to complete at least one of the one or more entries of the one or more data input fields. The method further includes causing the transmission of at least one of the one or more user prompts to the user and receiving a prompt response from the user. The method further includes displaying to the user a completed generated form in an appropriate channel format, and provides a process for secure e-signature and cross-stream utilization of user input.

15 Claims, 12 Drawing Sheets

Related U.S. Application Data

(60) Provisional application No. 63/182,367, filed on Apr. 30, 2021.

(51) Int. Cl.
  *G06F 40/131* (2020.01)
  *G06F 40/143* (2020.01)
  *G06F 40/186* (2020.01)

(56) References Cited

U.S. PATENT DOCUMENTS

| | | | |
|---|---|---|---|
| 9,009,585 | B1 | 4/2015 | Chetrit et al. |
| 9,208,253 | B2 | 12/2015 | Zoheir et al. |
| 9,361,598 | B2 | 6/2016 | Bird |
| 9,639,597 | B2 | 5/2017 | Eigner et al. |
| 9,736,540 | B2 | 8/2017 | Anderson et al. |
| 9,824,080 | B2 | 11/2017 | Kok et al. |
| 9,965,151 | B2 | 5/2018 | Zaveri et al. |
| 10,127,250 | B2 | 11/2018 | Dingman et al. |
| 10,372,733 | B2 | 8/2019 | Figner et al. |
| 10,445,419 | B2 | 10/2019 | Gaither et al. |
| 10,460,024 | B2 | 10/2019 | Gaither et al. |
| 10,585,982 | B2 | 3/2020 | Brisebois et al. |
| 10,643,164 | B2 | 5/2020 | Macciola et al. |
| 10,657,200 | B2 | 5/2020 | Gaither et al. |
| 10,686,772 | B2 | 6/2020 | Haddad |
| 10,699,349 | B2 | 6/2020 | Roberts et al. |
| 10,796,370 | B2 | 10/2020 | Rakshe et al. |
| 10,838,699 | B2 | 11/2020 | Dayanandan |
| 10,839,141 | B2 | 11/2020 | Warila et al. |
| 10,891,430 | B2 | 1/2021 | Carter et al. |
| 11,029,838 | B2 | 6/2021 | Lemay et al. |
| 11,113,333 | B2 | 9/2021 | Maharajh et al. |
| 11,140,233 | B2 | 10/2021 | Glommen et al. |
| 11,228,617 | B2 | 1/2022 | Raleigh |
| 11,228,640 | B2 | 1/2022 | Singh et al. |
| 2002/0194219 | A1 | 12/2002 | Awd et al. |
| 2003/0233316 | A1* | 12/2003 | Hu ................. G06Q 50/01 705/38 |
| 2007/0180148 | A1 | 8/2007 | Yadidian |
| 2007/0198910 | A1 | 8/2007 | Jensen et al. |
| 2007/0233495 | A1 | 10/2007 | Agapi et al. |
| 2009/0138794 | A1 | 5/2009 | Becker et al. |
| 2011/0191156 | A1 | 8/2011 | Etheredge et al. |
| 2011/0320605 | A1 | 12/2011 | Kramer et al. |
| 2012/0054593 | A1 | 3/2012 | Naderi |
| 2012/0159314 | A1 | 6/2012 | Schrier et al. |
| 2013/0013710 | A1 | 1/2013 | Wilson et al. |
| 2013/0021377 | A1 | 1/2013 | Doll |
| 2013/0198628 | A1 | 8/2013 | Ethier et al. |
| 2013/0283195 | A1* | 10/2013 | Bilgen ................. G06F 3/0485 715/767 |
| 2014/0222553 | A1 | 8/2014 | Bowman |
| 2014/0223277 | A1 | 8/2014 | Kimber et al. |
| 2014/0330659 | A1 | 11/2014 | Yopp et al. |
| 2015/0039988 | A1* | 2/2015 | Mei ................. G06F 3/04886 715/224 |
| 2016/0196110 | A1 | 7/2016 | Yehoshua et al. |
| 2016/0196499 | A1 | 7/2016 | Khan et al. |
| 2017/0192950 | A1 | 7/2017 | Gaither et al. |
| 2018/0046609 | A1 | 2/2018 | Agarwal et al. |
| 2018/0239837 | A1 | 8/2018 | Wang |
| 2019/0057161 | A1 | 2/2019 | Ackerman et al. |
| 2019/0138586 | A1* | 5/2019 | Dhawan ................. G06F 40/197 |
| 2019/0179885 | A1 | 6/2019 | Wong et al. |
| 2019/0236127 | A1 | 8/2019 | Guzman et al. |
| 2019/0238614 | A1 | 8/2019 | Ballinger |
| 2020/0401648 | A1 | 12/2020 | Kol et al. |
| 2021/0157618 | A1 | 5/2021 | Moon |
| 2021/0326093 | A1 | 10/2021 | Hinckley et al. |
| 2022/0237567 | A1 | 7/2022 | Tiwari et al. |
| 2022/0350958 | A1 | 11/2022 | Dantuluri |
| 2022/0350960 | A1 | 11/2022 | Heller |
| 2022/0350961 | A1 | 11/2022 | Dantuluri |

* cited by examiner

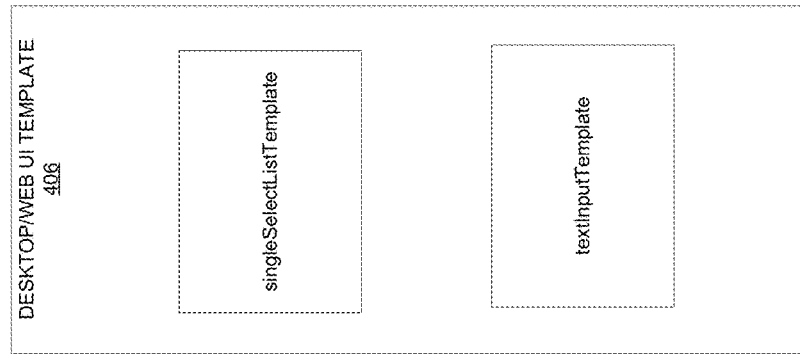
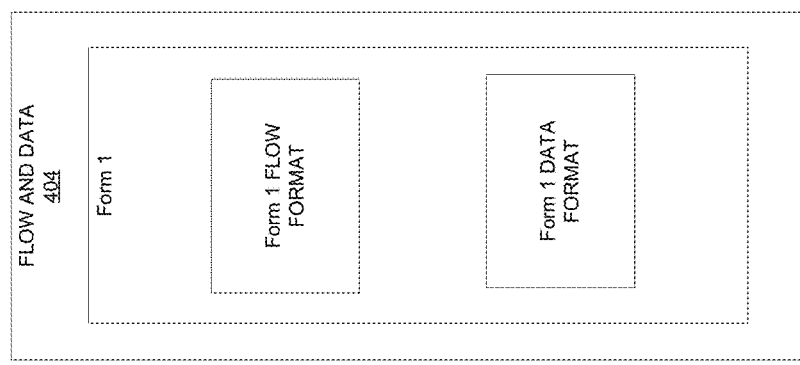
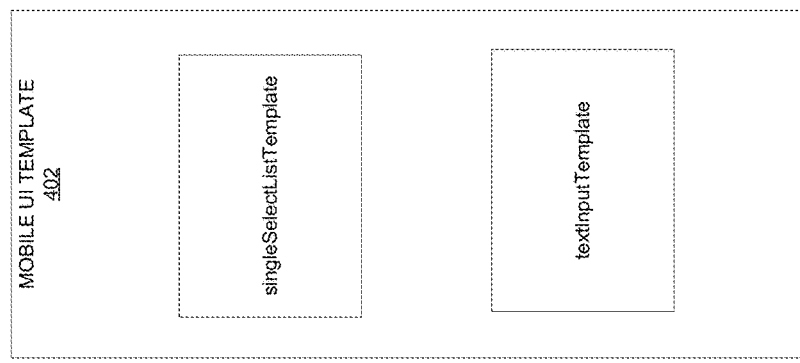
Figure 4

Figure 8a
800

NAVIGATE ACTION 802
```
{
  "action": "navigate",
  "navigateTo": "Names"
}
```

COLLECT ACTION 804
```
{
  "action": "collect",
  "widgets": [
    {
      "dataId": "firstName",
      "widgetID": "nameTXT"
    }
  ]
}
```

ENABLE ACTION 806
```
{
  "action": "enable",
  "widgets": [
    "Continue_Button"
  ]
}
```

Figure 8b
810

DISABLE ACTION 812
```
{
  "action": "disable",
  "widgets": [
    "Continue_Button"
  ]
}
```

ERROR ACTION 814
```
{
  "action": "error",
  "target": "id"
}
```

DELEGATE ACTION 816
```
{
  "action": "delegate",
  "context": "Reason",
}
```

CROSS CHANNEL DIGITAL DATA ARCHIVING AND UTILIZATION SYSTEM

CROSS-REFERENCE TO RELATED APPLICATIONS

The present application is a continuation-in-part of co-pending U.S. patent application Ser. No. 17/540,617, of the same title and filed on Dec. 2, 2021, which claims priority to U.S. Provisional Patent Application Ser. No. 63/182,367, filed Apr. 30, 2021, titled Cross Channel Digital Forms Integration and Presentation System, both of which are assigned to the assignee hereof and the contents of which are hereby expressly incorporated by reference in their entirety.

BACKGROUND

Currently, there are a multitude of types of forms for users that have various templates and requirements. Depending on the entity, a specific form may require unique formatting. When digitizing these forms, several challenges arise, such as displaying forms on a mobile device, onboarding of each form and each template, and allowing for inline editing. As such, a need exists for a cross channel digital form integration and presentation system. Additionally, it is preferable that the system possess the capability for structured storage of form data, separate from the specific form, such that the form data may be later utilized in a multitude of other contexts or for additional forms.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a cross channel digital form integration and presentation platform.

Currently, there are many different types of user forms, from government forms, to financial forms, to contracts, to agreements, or the like. These forms often contain multiple pages of uniquely formatted content and underlying formatting workflow instructions. The system described herein is able to digitize forms irrespective of the user channel being used to enter form information and display the completed form. Currently, the challenges with digitizing such forms include: properly displaying the forms on the various channels the user may utilize (e.g., mobile layout, webpage layout, email layout, program or application layout, operating system layout, or the like); the expense associated with onboarding each new form and its unique template; and finally, challenges with inline editing of the forms as they are being completed by the user.

The invention enables onboarding of various types of forms, and may push them out to users that may be using any communication channel or device to view the forms, such as different operating systems, or different channels such as mobile, web, or the like. As such, the invention provides a cross-channel solution, leveraging each channels technology. In this way, the system displays a form the way the native operating system would provide. The invention identifies sections or fields of the form that require user input, and presents those fields using and advanced digital solution. User input is stored on a backend server, and the system is used to generate a populated digital form after completion or partial completion by the user. The system is also expandable, allowing for a backend generation of new form templates, workflows, and addition of newly supported operating systems, system versions, applications, or the like, as necessary, irrespective of the channel, without altering the overall process or requiring system-wide updates.

The system follows a template-based design approach. In this way, each client channel may host a template for how a particular form should be applied via that channel. Each client channel will be able decide how the user interface (UI) templates are organized, the color, the layout, and the like. In this way, the client channel controls these elements of the form when displayed to the user. In this way, the system provides a predetermined UI template that is channel specific, and that can be repurposed for any kind of form, regardless of complexity.

Embodiments of the invention are directed to a system, method, or computer program product for a cross channel digital form integration and presentation, the invention comprising: extract one or more data input fields from a form, wherein the one or more data input fields comprise one or more entries to be completed on the form; generate one or more user prompts to be presented to a user in order to complete at least one of the one or more entries of the one or more data input fields; cause the transmission of at least one of the one or more user prompts to the user; receive one or more prompt responses from the user based on at least one of the one or more user prompts; based on the one or more prompt responses from the user, determine whether the one or more prompt responses meets one or more form requirements for a given entry; upon determination that the one or more prompt responses meets one or more form requirements for a given entry, update the form, wherein updating the form comprises completing the given entry based on the one or more prompt responses; generate a completed form based on the one or more prompt responses; store the one or more prompt responses in a structured data storage accessible by one or more systems; and display, via a channel, to the user the completed form in an appropriate channel format.

In some embodiments, the completed form is generated as a portable document format (PDF) file.

In other embodiments, the PDF file is transmitted to the user via the same channel of communication as is used to transmit the one or more user prompts.

In still further embodiments, the confirmation request is a request for an electronic signature.

In some embodiments, the structured data storage utilizes an extensible markup language file format to store a unique user-based file containing the one or more prompt responses.

In some embodiments, the invention further comprises accessing the structured data storage and using the unique user-based file to pre-populate one or more additional forms requiring the same information from the user.

In some embodiments, the invention further comprises displaying an option to securely e-sign the completed form; invoking a separate program to complete the e-sign process; and transmitting instructions to the separate program to complete the e-sign process using the same channel of communication as is used to transmit the one or more user prompts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
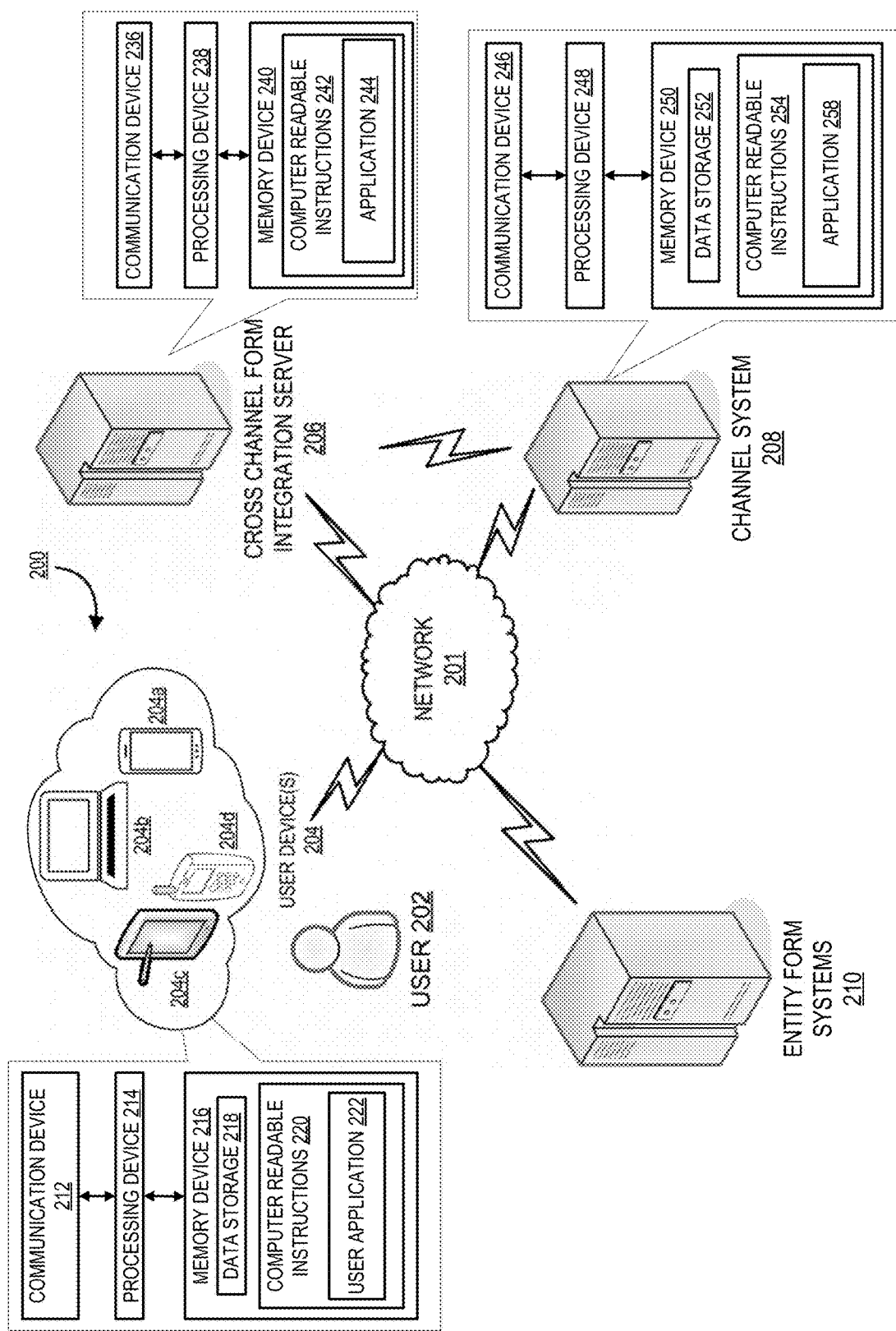
Figure 2:
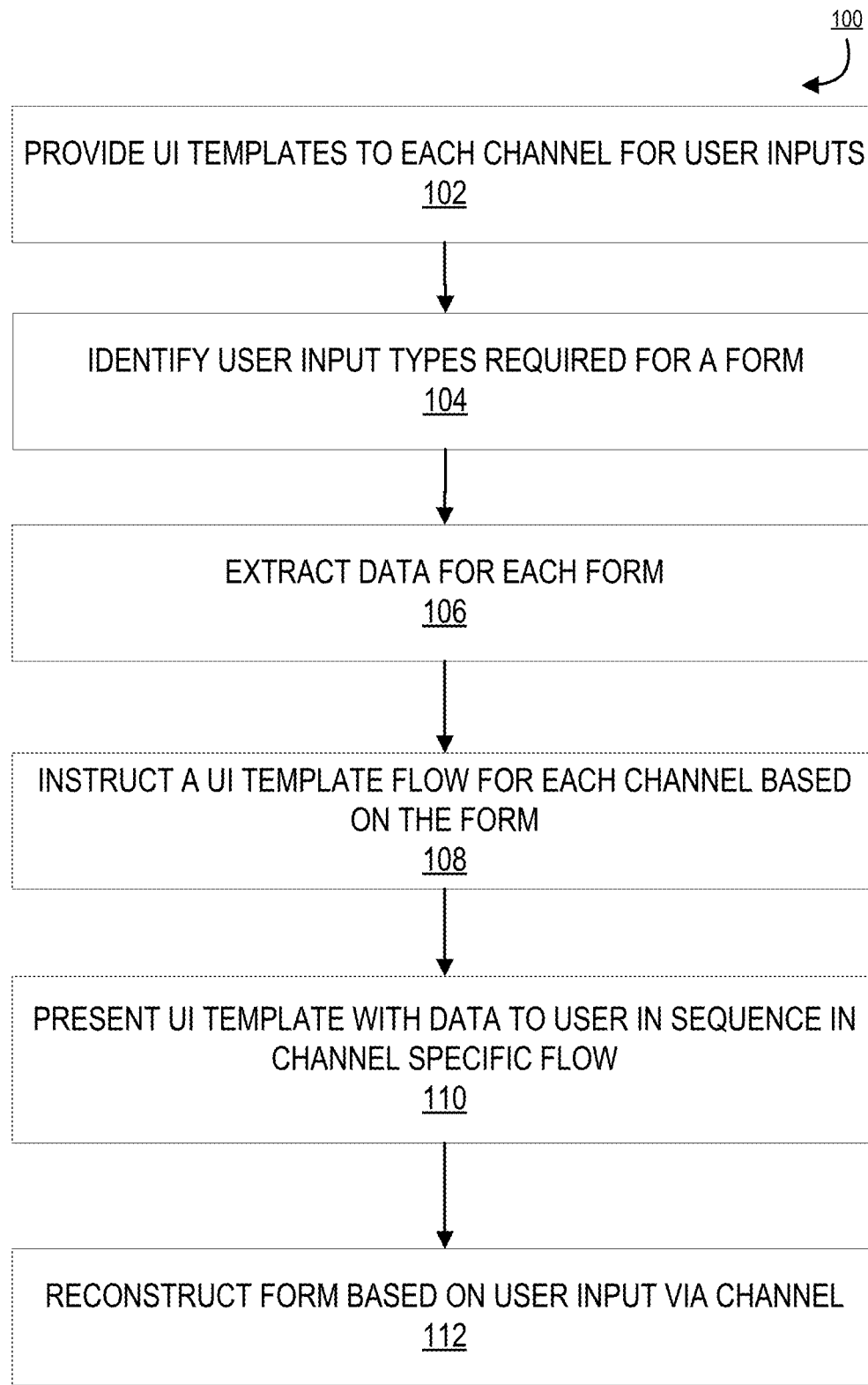
Figure 3:
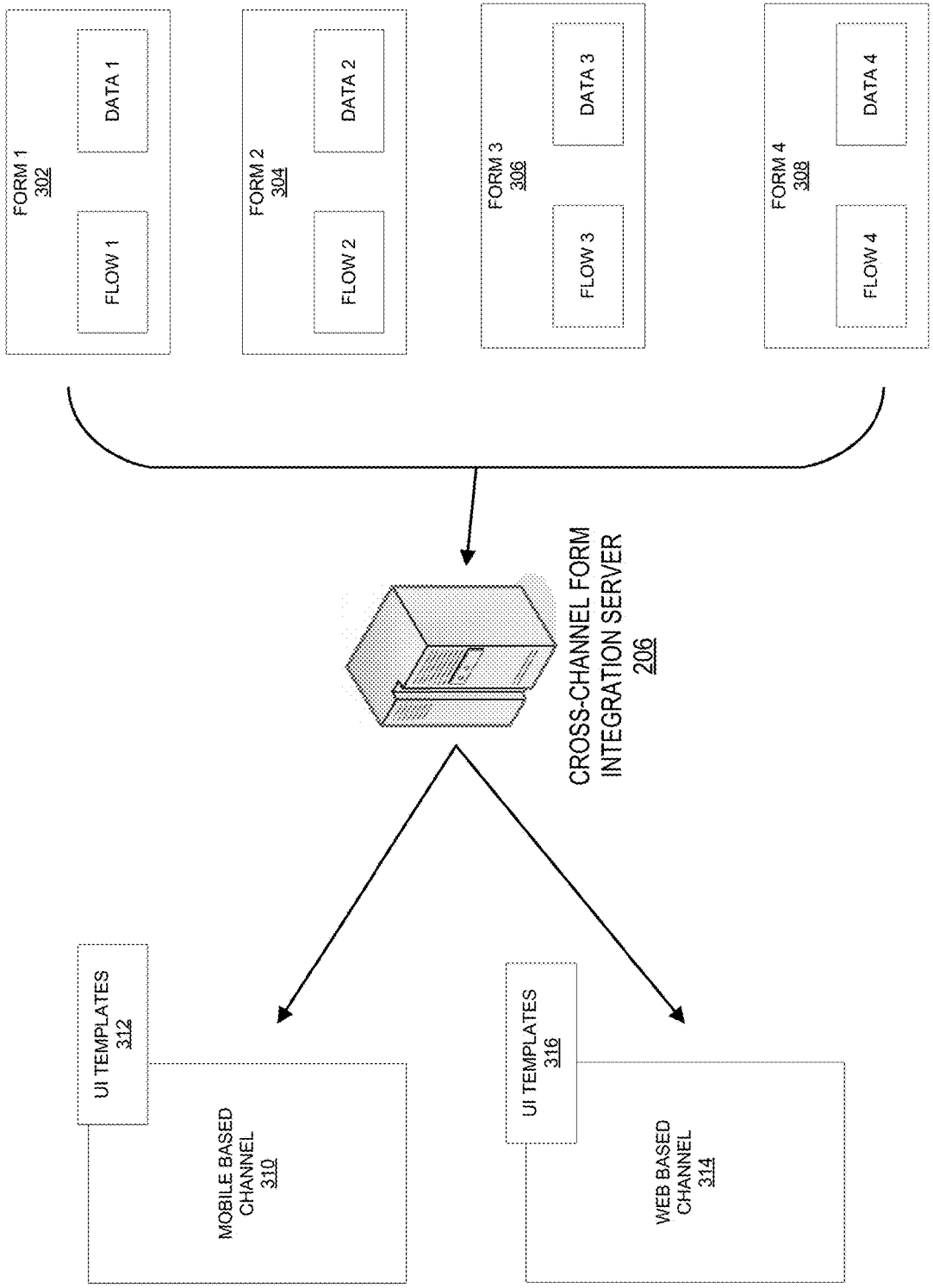
Figure 5:
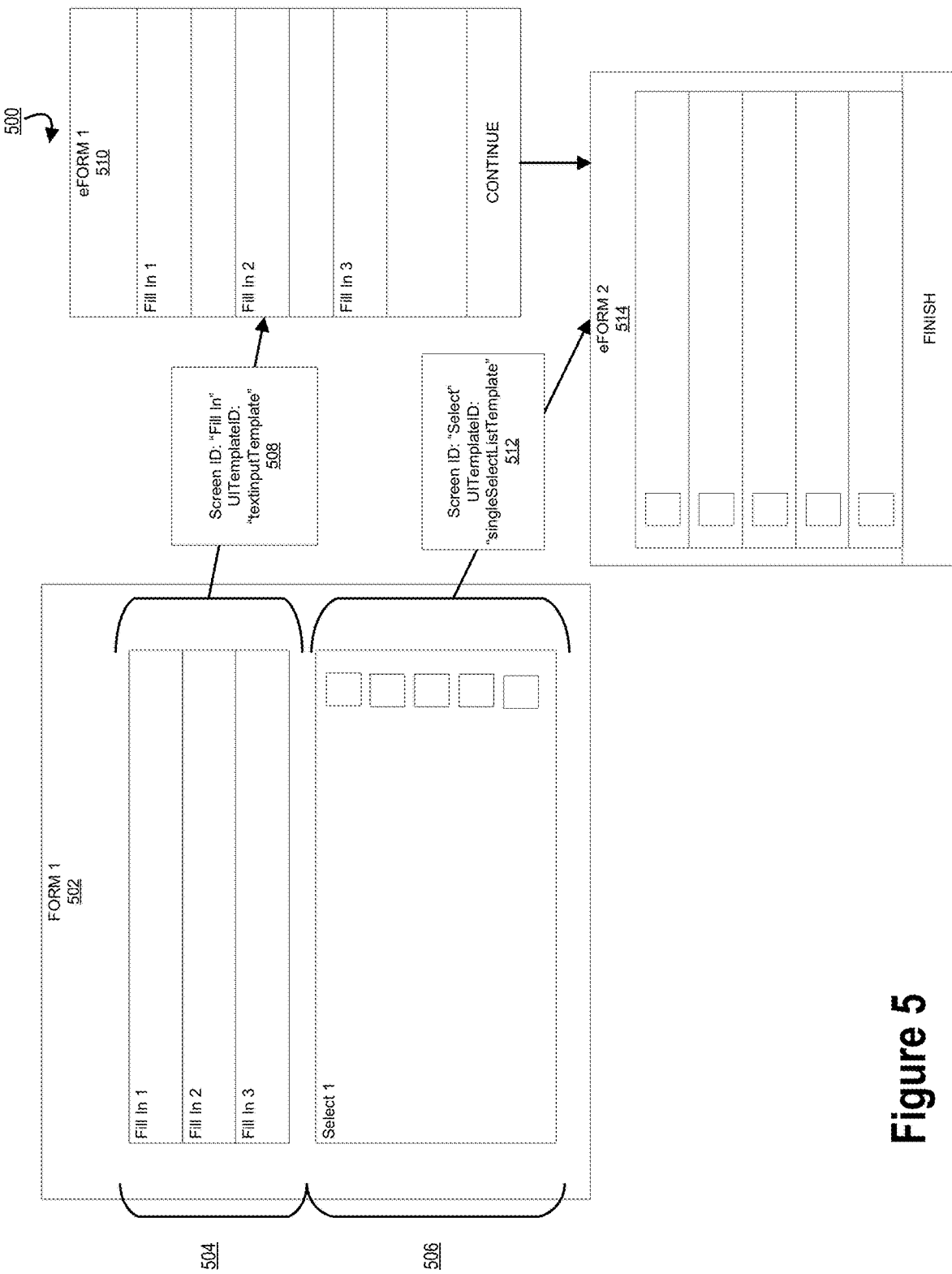
Figure 6C:
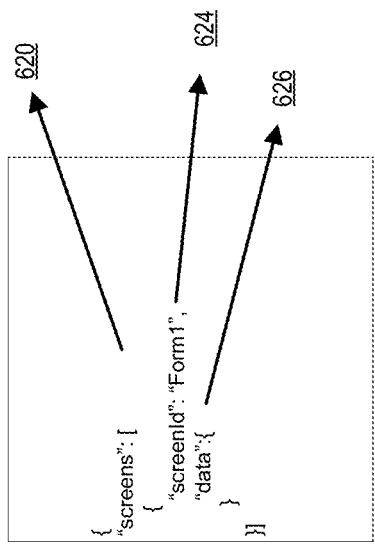
Figure 6A:
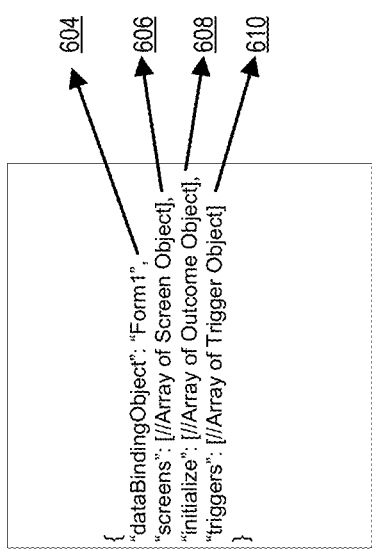
Figure 6B:
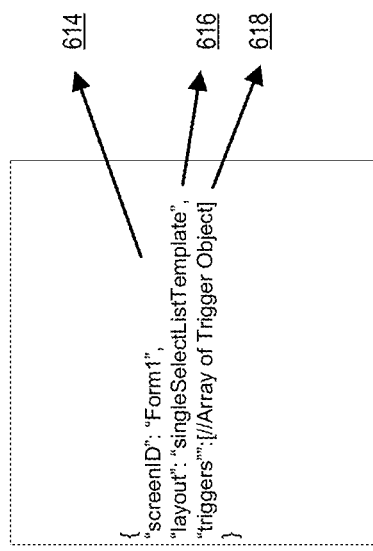
Figure 7:
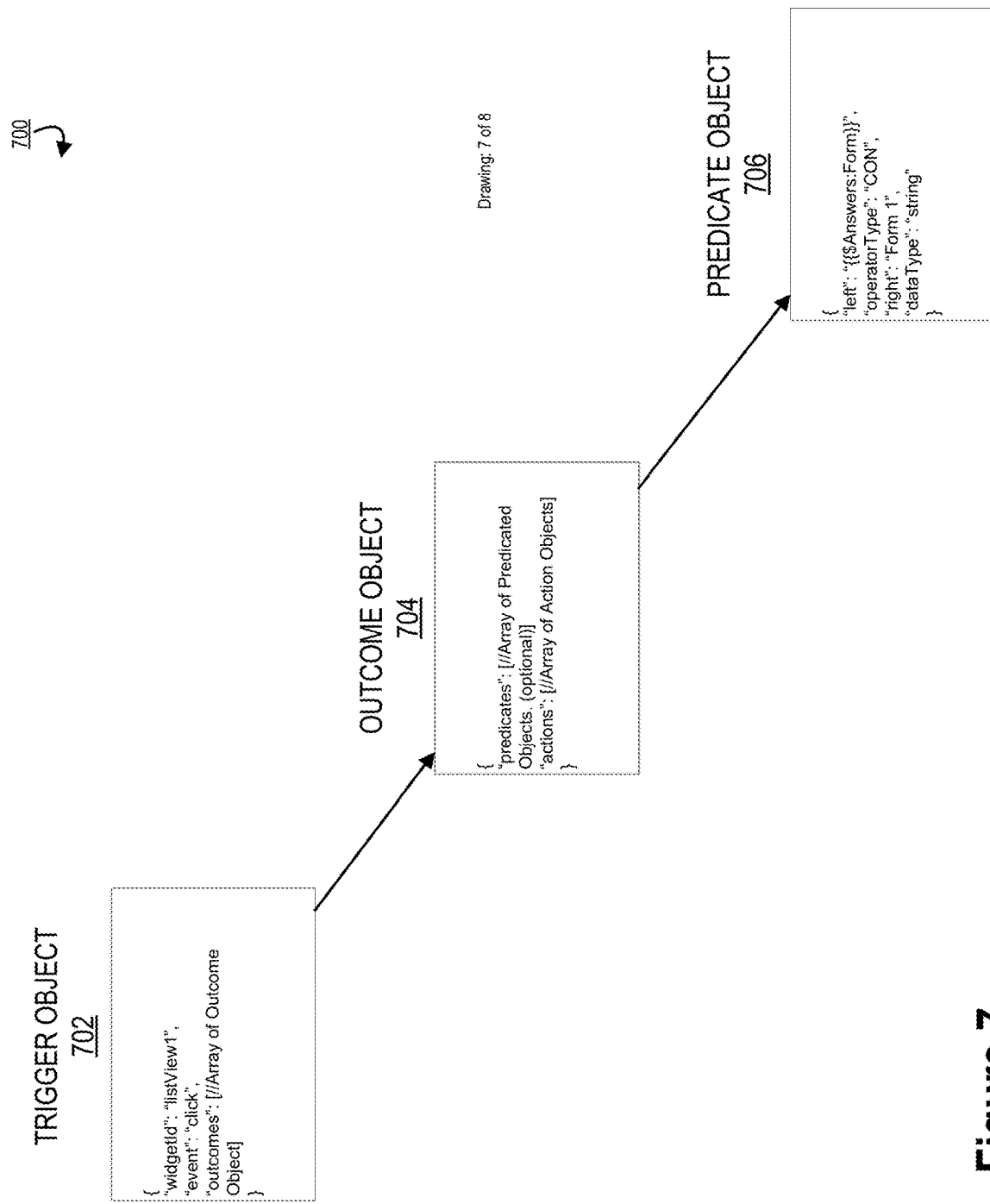
Figure 9:
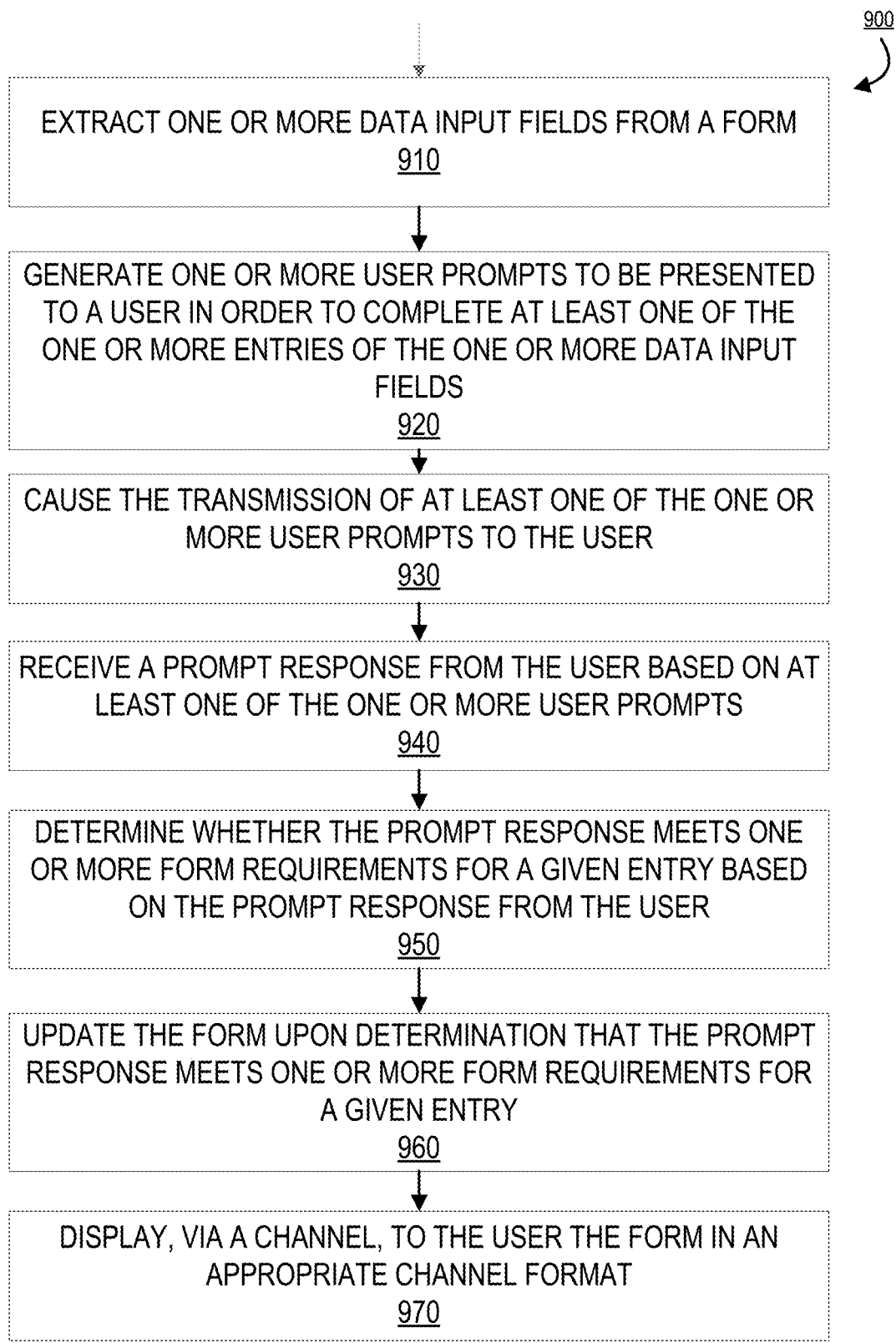
Figure 10:
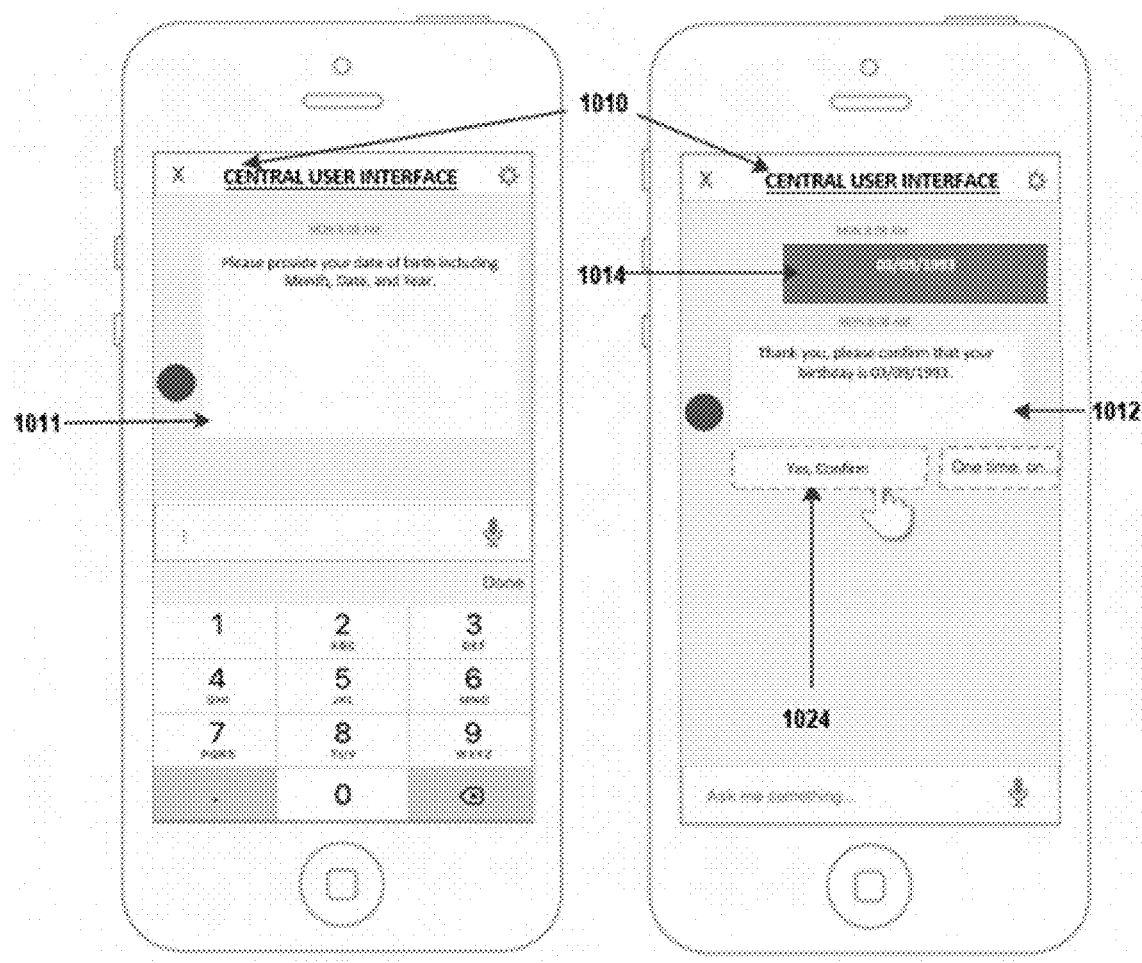
Figure 11:
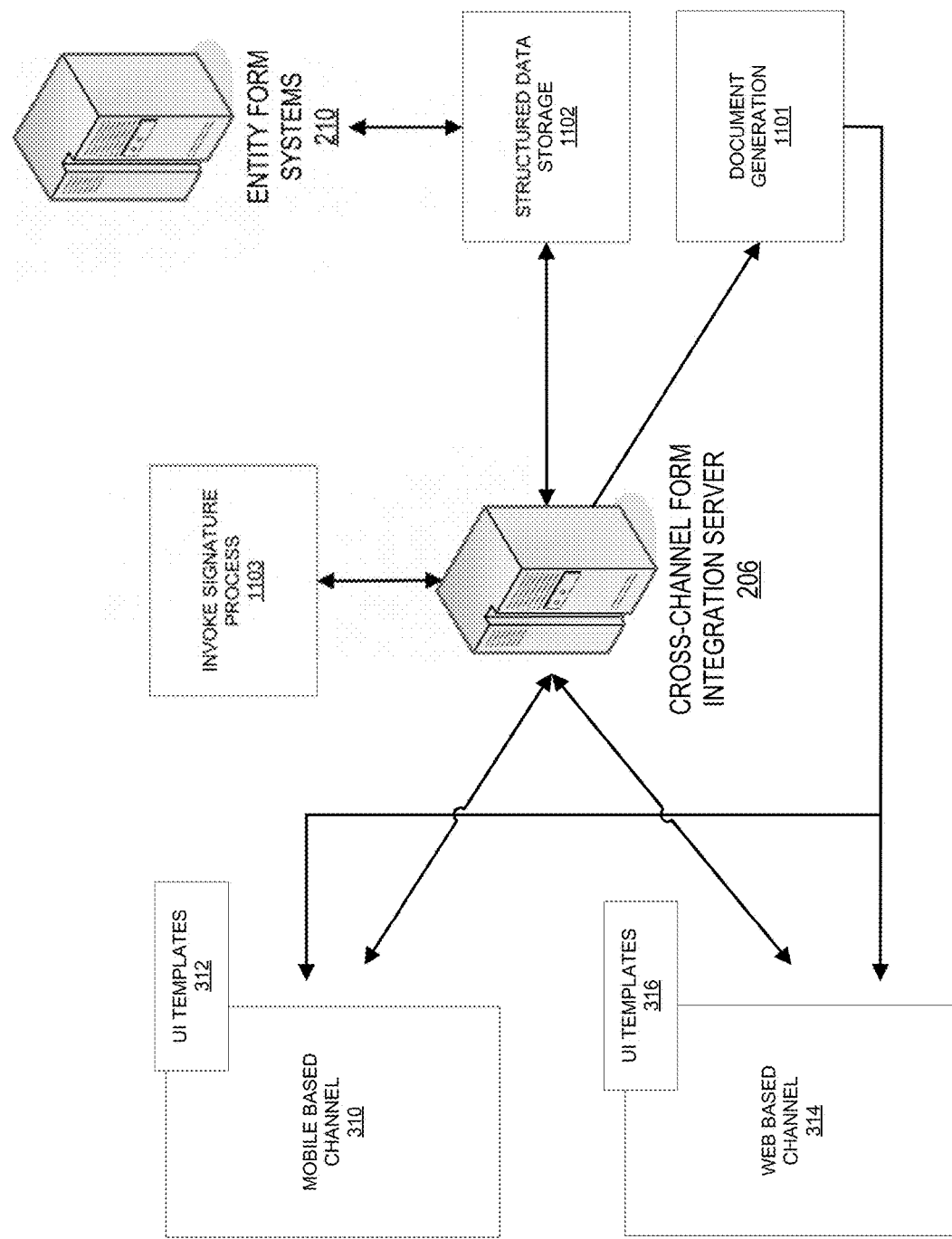
Figure 12:
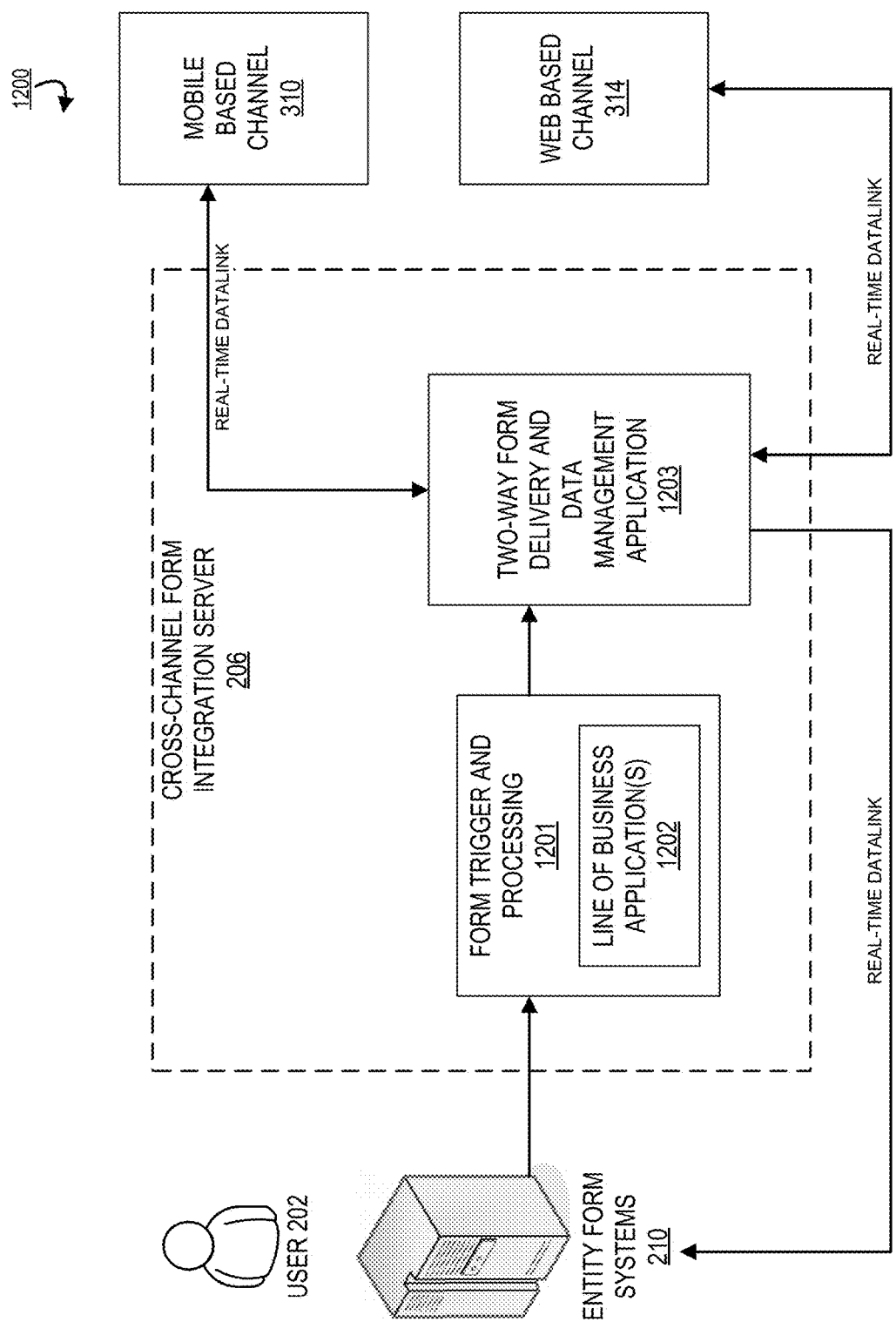

Having thus described embodiments of the invention in general terms, reference will now be made to the accompanying drawings, wherein:

FIG. 1 provides a cross-channel digital forms integration and presentation system environment, in accordance with one embodiment of the present invention;

FIG. 2 illustrates a high level process flow of the cross-channel digital forms integration and presentation process, in accordance with one embodiment of the invention;

FIG. 3 illustrates a high level process flow of the cross-channel digital forms integration and presentation system interactions, in accordance with one embodiment of the invention;

FIG. 4 illustrates a high level process flow of template ownership across the cross-channel digital forms integration and presentation system, in accordance with one embodiment of the invention;

FIG. 5 illustrates a high level process flow illustrating the process of form breaking down into UI templates for channel distribution, in accordance with one embodiment of the invention;

FIG. 6a illustrates a high level flow template structure, in accordance with one embodiment of the invention;

FIG. 6b illustrates a high level flow template screen object, in accordance with one embodiment of the invention;

FIG. 6c illustrates a high level data template structure, in accordance with one embodiment of the invention;

FIG. 7 illustrates a high level flow template of a trigger object, in accordance with one embodiment of the invention;

FIG. 8a illustrates a high level flow template for navigation actions, in accordance with one embodiment of the invention;

FIG. 8b illustrates a high level flow template for disable actions, in accordance with one embodiment of the invention;

FIG. 9 illustrates a high level process flow of the cross-channel digital forms integration and presentation process, in accordance with one embodiment of the invention;

FIG. 10 illustrates an example central user interface to be provided to a user during various operations discussed in reference to FIG. 9, in accordance with one embodiment of the invention;

FIG. 11 illustrates a high level process flow of the cross-channel digital forms integration and presentation system interactions and structured storage, in accordance with one embodiment of the invention; and FIG. 12 illustrates a high level process flow of the cross-channel digital forms integration and presentation server for real-time datalink via multiple channels, in accordance with one embodiment of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to a system, method, or computer program product for a template based design approach for cross channel digital form integration and presentation. The system allows for onboarding of various types of forms to push them out to users via multiple various user viewing channels. The invention identifies the sections or fields of the form that require user input and presents those fields using an advanced digital solution illustrated in the channel format. The system is expandable, allowing for a single backend upload of additional forms irrespective of the channel.

As used herein, a "user" may be an individual in communication with an entity and reviewing one or more forms or documents associated with the communication or otherwise utilized the applications disclosed herein. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including the temporal platform may refer to a platform that is used as a base upon which other applications, processing, or technologies are distributed including applications, activities, integration into currently used applications, integration into systems, presentation of user interfaces, and the like.

Further, the embodiments described herein may refer to use of a form. A form may be any physical or digital document requiring a user to fill out, check, or otherwise mark in association with a communication with an entity.

The embodiments described herein may also refer to a channel or a channel client. A channel may be any software or operating system that hosts a user to view a form. This may also include whether the user is viewing the form on the channel via mobile or web-based.

FIG. 1 provides a cross-channel digital forms integration and presentation system environment 200, in accordance with one embodiment of the present invention. As illustrated in FIG. 1, the channel system 208 is operatively coupled, via a network 201 to the user device 204, to the cross-channel form integration server 206, and to entity form systems 210. In this way, the channel system 208 can send information to and receive information from the user device 204, the cross-channel form integration server 206, and the entity form systems 210. FIG. 1 illustrates only one example of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

As illustrated in FIG. 1, the channel system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the cross-channel form integration server 206, the user device 204, and the entity form systems 210. As such, the communication device 246 generally comprises a modem, server, or other device for communicating with other devices on the network 201.

As further illustrated in FIG. 1, the channel system 208 comprises computer-readable instructions 254 stored in the memory device 250, which in one embodiment includes the computer-readable instructions 254 of an application 258. In some embodiments, the memory device 250 includes data storage 252 for storing data created and/or used by the application 258. In the embodiment illustrated in FIG. 1 and described throughout much of this specification, the application 258 may perform the functions disclosed herein. The channel system 208 recognizes the channel the user is using and requesting a form from. The system may use the appropriate form for the user and for the channel selected by the user.

As illustrated in FIG. 1, the cross-channel form integration server 206 generally comprises a communication device 236, a processing device 238, and a memory device 240. As further illustrated in FIG. 1, the cross-channel form integration server 206 comprises computer-readable instructions 242 stored in the memory device 240, which in one embodiment includes the computer-readable instructions 242 of an application 244.

In the embodiment illustrated in FIG. 1, the application 244 allows the cross-channel form integration server 206 to be linked to the channel system 208 to communicate, via a network 201, the information related to transactions associated with entity form systems 210.

FIG. 1 also illustrates a user device 204. The user device 204 may be a number of computing devices or mobile computing devices such as a smart phone 204a, a telephone 204d, a tablet 204c, a computer 204b, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the cross-channel form integration server 206, the channel system 208, and the entity form systems 210. As such, the communication device 212 generally comprises a modem, server, or other device for communicating with other devices on the network 201.

As further illustrated in FIG. 1, the user device 204 comprises computer-readable instructions 220 stored in the memory device 216, which in one embodiment includes the computer-readable instructions 220 of a user application 222. A user device 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, laptop computers, cameras, video recorders, audio/video player, radio, GPS devices, any combination of the aforementioned, or the like. Although only a single user device 204 is depicted in FIG. 1, the system environment 200 may contain numerous mobile devices 204.

The entity form systems 210 are operatively coupled to the channel system 208, the cross-channel form integration server 206, and/or the user device 204 through the network 201. The entity form systems 210 have systems with devices the same or similar to the devices described for the channel system 208, the cross-channel form integration server 206, and/or the user device 204 (i.e., communication device, processing device, and memory device). Therefore, the entity form systems 210 communicate with the channel system 208, the cross-channel form integration server 206, and/or the user device 204 in the same or similar way as previously described with respect to each system.

As such, the entity form systems 210 generally comprises a communication device, at least one processing device, and a memory device. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 201 and other devices on the network 201. As such, the communication device generally comprises a modem, server, wireless transmitters or other devices for communicating with devices on the network 201. The memory device typically comprises a non-transitory computer readable storage medium, comprising computer readable/executable instructions/code, such as the computer-readable instructions, as described below.

As further illustrated in FIG. 1, the entity system 210 comprises computer-readable instructions or computer readable program code stored in the memory device, The computer readable instructions, when executed by the processing device 138 are configured to cause the processing device to perform one or more steps described in this disclosure such as to provide entity specific forms to the network 201.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow of the cross-channel digital forms integration and presentation process 100, in accordance with one embodiment of the invention. As illustrated in block 102, the process 100 is initiated by providing one or more UI templates to each channel for user inputs. This may include one or more types of user inputs, but may include the coloring, formatting, and the like associated with the channel such that the flow of the page will be similar to the channel pages visualized by the user.

As illustrated in block 104, the process 100 continues by identifying user input types required for a form. In this way, the system may identify the data that includes the questions or input requirements for the user. This may also include the type of input, such as a drop down selection, check box selection, fill in, or the like.

As illustrated in block 106, the process 100 continues by extracting the particular sections of the form that require user input. The particular sections of the form that require user input may be specific questions, or the like, on the form which require the user to input an answer or information in order to complete the form.

The process 100, continues by instructing a UI template flow from each channel associated with a user based on the particular sections of the form requiring user input, as illustrated in block 108. In this way, the first portion of the form may require a check box selection and the second portion of the form may require a fill-in section. The system may instruct the channel to utilize the UI template associated with a check box selection first, followed by a UI template associated with a fill-in section.

The one or more UI templates from the channel are then presented to the user with the data in a sequenced order, as illustrated in block 110. The data is presented in channel specific flow, such that the channel font, color, and the like is channel specific, but the data provided is based on the form and the data extracted from the form. Finally, as illustrated in block 112, the process 100 is finalized by reconstruction of the form based on user input at the channel by formatting the user provided data to fit the original format of the form (e.g., matching text font, text size, or the like, to match that of a form template).

FIG. 3 illustrates a high level process flow of the cross-channel digital forms integration and presentation system interactions 300, in accordance with one embodiment of the invention. As illustrated, the cross-channel form integration server 206 may accept forms from one or more entities for user input. These forms may include Form 1 302, Form 2 304, Form 3 306, and Form 4 308. One will appreciate that while only four forms are illustrated in FIG. 3, there may be many more forms associated with the system. Each form may have a flow and a data associated with it. The flow may be the visual aspects of the form, such as the coloring, font, type, font size, branding elements, form structure or placement of fields, form labeling, form page size, page orientation, or the like. The data may include specific questions the form contains that the user must provide answers to in order to complete the form.

The cross-channel form integration server 206 may provide the data for each form in a specific parsed out order to each channel. As illustrated in FIG. 3, the mobile-based channel 310 and the web-based channel 314 are illustrated. While only two channels are illustrated, one of skill in the art will appreciate that several other channels may be available for a user to access a form. As illustrated, each channel has a pre-stored UI template. The mobile-based channel 310 has mobile UI templates 312 and the web-based channel 314 has UI templates 316. These templates comprise the font, color, format, and the like associated with the channel. The cross-channel form integration server 206 provides the data from the various forms in a specific order to the channel for user display via the channel.

FIG. 4 illustrates a high level process flow of template ownership across the cross-channel digital forms integration and presentation system 400, in accordance with one embodiment of the invention. This illustrates the communication with the system to the channel in order for the channel to know what UI template to present, the order to present the UI template, and the data to present via the UI template. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like file formats. The system uses two of these open standard file formats a flow and a data.

As illustrated in block 404 the flow and data formats are provided to the channel. The flow provides instructions for the flow of UI templates for the channel to user, additional validation rules to apply to each UI template, and provides an indication of it there are any interdependent UI templates (for example, a second question in a string of questions is dependent on how the user answers the first question in the string). The data provides the actual text that needs to be displayed on the user device screen, such as a question "what is your name" or the like. The formats are channel agnostic and does not contain any colors, formats, fonts, or the likes associated with the data.

The flow and data 404 are transmitted to the channel systems. These may be a mobile device or a desktop device or the like. As illustrated in FIG. 4, the flow and data 404 may be transmitted to a mobile device that comprises a mobile UI template 402. The mobile UI template 402 is pre-populated at the channel level and is able to accept the flow and data 404 to transmit a display of the information on the user device via the mobile channel. The mobile UI template 402 comprises the various ways in which the data is displayed, such as via a selection list or via user text input. As such, if the flow and data 404 require a user to input text into a field of the form, the mobile UI template will display the form data via the textInputTemplate. If the flow and data 404 require a user to select a box or select an item within the form, the mobile UI template will display the form data via the singleSelectListTemplate.

The desktop/web UI template 406 is pre-populated at the channel level and is able to accept the flow and data 404 to transmit a display of the information on the user device via the desktop or web channel. The desktop/web UI template 406 comprises the various ways in which the data is displayed, such as via a selection list or via user text input. As such, if the flow and data 404 require a user to input text into a field of the form, the desktop/web UI template will display the form data via the textInputTemplate. If the flow and data 404 require a user to select a box or select an item within the form, the desktop/web UI template will display the form data via the singleSelectListTemplate.

FIG. 5 illustrates a high level process flow illustrating the process of form breaking down into UI templates for channel distribution 500, in accordance with one embodiment of the invention. No matter how the form looks the invention does not present the form and its complexities as is to the user. The system breaks down the original form into sets of inputs for the user. The system identifies the parts of the form that require user input and transmit those parts of the form to the user. The user device is pre-populated with the appropriate channel specific format, color, and the like for the data. The system then presents these user input sections to the user in the channel associated with the user device.

For example, as illustrated in FIG. 5, Form 1 502 is identified to have two sections that require user input. These include a fill in section 504 and a select section 506. In this way, the system identifies the locations on a form that the user is required to put a text input. This input could be writing or filling in a portion, such as writing a name, date, or other information. This input could be selecting a box, selection one option from several options, radio buttons, calendars, notes, drop down selection, signature, and the like. With these limited input options, the system is able to generate almost every possible form a user may need to populate based on mixing and matching the various input options in order to create any number of forms regardless of form complexity. The system identifies two sections in Form 1 502, one section that the user is required to fill in the blank 504 and one section where the user is required to check one or more boxes 506. The complexity of Form 1 502 outside of these two sections is irrelevant and is not transmitted to the user channel.

Each channel will have pre-programed input templates that are called UI templates. Each channel has the pre-programmed UI templates, that for any type of form the system may notify the channel of the order of the pre-programmed UI templates for each type of form. For example, for the form illustrated in FIG. 5, the system may notify the channel to utilize pre-programmed UI template "testinputTemplate" followed by pre-programmed UI template "singleSelectListTemplate", which correspond to the type of input the user may be required to provide. The channel may input the data from the system into the pre-programmed UI template to generate a displayable form to the user in the appropriate channel format. The system may collect the data from the channel and populate the original form for uniformity.

In this way, as illustrated in block 508, the system processes the fill in the blank 504 section and provides information to the channel to present the section to the user in the form of the eForm 1 510. This includes a screen identification, a UI template identification for the channel, and the data to put into the eForm 1 510.

Furthermore, the system may select an order of eForms, such as presentation of eForm 1 510 first then eForm 2 514. After the user has filled in Fill in 1, Fill in 2, and Fill in 3, the user may select continue. Upon selection, the user may be presented eForm 2 514. eForm 1 510 and eForm 2 514 may be part of the same Form 502 but the system may divide them based on user input type for appropriate channel UI template presentation for the various parts of the form 1 502. For eForm 2 514, instructions such as the screen identification, UI template identification, and the data to be presented may be transmitted to the channel for display as illustrated in block 512.

FIG. 6a illustrates a high level flow template structure, in accordance with one embodiment of the invention. This illustrates the communication with the system to the channel in order for the channel to know what UI template to present, the order to present the UI template, and the data to present via the UI template. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like file formats. The system uses two of these open standard file formats a flow and a data. The flow, as illustrated in FIG. 6a, has the flow of UI templates for the channel to user, additional validation rules to apply to each UI template, and provides an indication of it there are any interdependent UI templates (for example, a second question in a string of questions is dependent on how the user answers the first question in the string). The data format is further illustrated below in FIG. 6c.

In this way, each flow has an array of UI templates, each template object has an array of triggers, each trigger object has an array of outcomes, each outcome object has an array of predicates and an array of actions.

As illustrated in section 604 the flow format provides the corresponding data file name associated with this flow format. Next, as illustrated in section 606 the flow format provides instructions for all screens associated with the form, as represented in an array of Screen Objects. As illustrated in section 608, the flow format provides an array of outcome Objects. These are used when the flow needs to be started with a different screen other than the first screen presented. As illustrated above in FIG. 5, a single form may be parsed into several different screens for the user to view the form appropriately at the channel. Finally, as illustrated in block 610, this flow format provides an array of trigger objects. These trigger objects are used when common triggers are required across screens in order to reduce duplicate code.

FIG. 6b illustrates a high level flow template screen object, in accordance with one embodiment of the invention. As illustrated each flow template object would have a business name, the one illustrated in FIG. 6b is Form 1 614. This is the screen identification set by the channel for every screen. This identification is used for mapping the screen data in the data format. Next, as illustrated in section 616, the UI template to be used in the screen of the user is provided, which in this case is singleSelectListTemplate, which is a selection list that allows a user to select one of a list of options. This UI template has to match the UI template pre-populated and published to the channel. Finally, as illustrated in section 618, array of triggers associated with the screen are provided. This is where all the click actions and order of selection is provided for user navigation. The trigger is the selection of a response by the user or a user entering data into a text box. This trigger confirms that the user performed the correct trigger and allows for proceeding to the next question within the form.

FIG. 6c illustrates a high level data template structure, in accordance with one embodiment of the invention. The data format provides the UI template with the data and text to be inputted into the UI. As illustrated in section 620, the data format provides an array of screen data objects for the particular flow. Next, as illustrated in section 624 the screen identification is matched and identified as Form 1. Finally, as illustrated in section 626 the data format defines an object with a key value pair. The key value pair is a variable defined in the screen and value is the one to be replaced with. In this way, the data template structure provides the text off the form to the UI for display in the channel specific manner.

FIG. 7 illustrates a high level flow template of a trigger object 700, in accordance with one embodiment of the invention. As illustrated in block 702 the trigger object contains doe for a UI identifier associated with the form and the event. The event associated with the user action, in this case the action is a "click" followed by a list of possible outcomes associated with the user action. This outcome can include collecting data, moving to the next UI template screen or the like.

Next, as illustrated in block 704, the process 700 continues to the outcome object. The outcome object 704 comprises predicates that provides a list of conditions that need to be satisfied before executing the action. Predicates are prerequisites that are required before an outcome can be produced. For example, if the form asks for an email address of the user, the predicate can confirm that the user is inputting text, such as an "@" that delineates the user has inputted what appears to be an appropriate input for the question. Furthermore, the outcome object 704 provides an array of actions that need to be executed based on the user actions, which are outlined in further detail below in FIG. 8a and FIG. 8b.

In this way, each flow has an array of UI templates, each template object has an array of triggers, each trigger object has an array of outcomes, each outcome object has an array of predicates and an array of actions.

Finally, as illustrated in block 706, the process 700 is finalized with the predicted object. The predicted object 706 provides a static or dynamic equation with a type of operation that is needed to be performed and the data type for the information, such as strings, numbers, dates, or the like.

FIG. 8a illustrates a high level flow template for navigation actions 800, in accordance with one embodiment of the invention. The navigation actions 802 include a definition of the type of action to be performed by the user and defines the next screen to navigate to base on the action. Next, the collect action 804 includes a definition of the action to be performed, and an array of elements for which data needs to be collected for that action. Furthermore, the collect action 804 defines the key to where the data needs to be mapped to and the UI template identifier associated with the data collection. Finally, the enable action 806 defines the type of action to be performed and provides an array of UI identifiers as strings that need to be enabled.

FIG. 8b illustrates a high level flow template for disable actions 810, in accordance with one embodiment of the invention. As illustrated in the disable action 812, the process 810 is initiated by defining the type of action to be performed and provides an array of UI template identifiers as strings that need to be disabled. The error action 814 defines the type of action to be performed and identifies the UI element that needs to be shown based on the error. Finally, the delegate action 816 defines the type of action to be performed and provides the context and/or reason for the delegation of the action back to the wrapper to handle the specific function.

Referring now to FIG. 9, a flowchart 900 is provided illustrating an example method of cross channel digital form integration and presentation. Various systems and devices discussed herein may be capable of carrying out the operations of FIG. 9.

Referring now to Block 910 of FIG. 9, the method includes extracting one or more data input fields from a form. The one or more data input fields include one or more entries to be completed on the form.

Referring now to Block 920 of FIG. 9, the method includes generating one or more user prompts to be presented to a user in order to complete at least one of the one or more entries of the one or more data input fields.

Referring now to Block 930 of FIG. 9, the method includes causing the transmission of at least one of the one or more user prompts to the user.

Referring now to Block 940 of FIG. 9, the method includes receiving a prompt response from the user based on at least one of the one or more user prompts.

The system is configured to receive, recognize, and interpret these linguistic phenomena of the user input and perform user activities accordingly. In this regard, the system is configured for natural language processing and computational linguistics. Based on analyzing the received activity input, the system is configured to determine the user activity that the user seeks to perform, as indicated by block 206. Here, in general, the system may parse the activity input (e.g., the prompt response) from the user to detect one or more words that make up the activity input from the user. The system may then analyze words to determine the information to complete an entry in the given form. For example, the system may receive the voice activity input from the user that indicates the user's birthday in response to the system requesting the user's birthday. The system may then analyze the one or more words to determine that the user provided said user's birthday. The system may then proceed to update an entry in the form corresponding to the user's birthday through the central user interface.

Specifically, based on receiving the activity input (e.g., prompt response) from the user, in some instances, the system is configured to generate a parse tree based on detected one or more words and/or the detected keywords. A parse tree is a data structure that allows the system to accurately analyze activity input. For example, the parse tree may indicate the various language structures, such as clauses, phrases, subjects, verbs, and objects in a spoken statement and identify the words in each language structure. The system may analyze the parse tree to determine the user activity to be performed and the intent of the user and also to determine any parameters provided by the user for an invoked service. The system may invoke another application, a service, an activity functionality and the like based on its analysis of parse tree.

In addition to verbal user prompts, the system may be configured to initiate presentation of a central user interface 1010 of the multi-channel cognitive resource application stored on the user device, as shown in FIG. 10. In such an instance, the system may receive a user input 1014. For example, this input 1014 may be received via an audio communication channel and/or a textual communication channel. The user input 1014 may be in response to a user prompt 1011. As shown, the system requests the date of birthday of the user. Such a request may be visual and/or verbal. The system may be configured to interpret and transform, seamlessly and in real-time, one medium to another for presentation on the central user interface (for example, speech to text, text to speech and the like). The system may present the received activity input 1012 from the user in a textual format. The system may similarly respond to the user input, as indicated by the output 1012, in natural language. In addition, the system may present one or more interactive elements 1024 for facilitating the activity, which are embedded, integrated into, or overlaid over the central user interface 1010. These interactive elements may be actuated by tactile input (touch commands and other gestures), audio commands or textual input from the user. These interactive elements 1024 may be extracted from other pertinent applications, such as resource applications, discussed previously.

In addition, the system is intuitive and is configured to hold complex and branched conversations with the user, in the pursuit of completing one or more user activities. In this regard, the system is configured to detect and conduct branched conversations using intelligent complex path looping. In some instances, the system may identify a suitable conversation path for completion of a user initiated activity, and proceed to request information accordingly. For example, for a user activity of making reservations at a restaurant, the system may determine a conversation path that includes multiple entries within a given form. For example, the conversation path may walk through various questions relating to personal information including name, date of birth, identification numbers, and/or the like. These conversation paths are typically natural language conversational forms of the user activity events described previously, and may be determined by the system, after or in conjunction with determining the one or more discrete activity events.

In addition, the intelligent complex path looping of the invention enables the system to loop back to the original conversation path for completion of the activity in the instances where the user digresses or the conversation branches out.

Referring now to Block 950 of FIG. 9, the method includes determining whether the prompt response meets one or more form requirements for a given entry based on the prompt response from the user. Upon receiving the prompt responses, either verbal or otherwise, the system may be configured to determine whether the prompt response meets a given form requirement for a given entry. This may include determine whether the type of response is appropriate for the given entry (e.g., a date for birth date) and/or whether the prompt response is in the correct format (e.g., MM/DD/YYYY format for a birthday). In an instance in which the prompt response does not meet one or more form requirements, the system may be configured to request additional information from the user. For example, the system may request the information again (e.g., repeat the same request), ask for a confirmation of information, or request new information (e.g., for a birthday, the user may have only provided a partial birthday without the year and the system may be configured to request the year as well). Upon determination that the prompt response meets one or more form requirements, the system may be configured to update the form (e.g., Block 960).

Referring now to Block 960 of FIG. 9, the method includes updating the form upon determination that the prompt response meets one or more form requirements for a given entry. Updating the form includes completing the given entry based on the prompt response. Such updating may be completed by the system or provided to a third party to complete said form. For example, the system may generate a form based on information requested and update said generated form upon obtaining given information.

The system may be configured to cause a transmission of a confirmation request to the user to confirm that one or more entries are correct. Such a confirmation request may be transmitted before and/or after the form is updated based on the prompt response. For example, the form may not be updated until the user confirms that the entry is correct, or the form may be updated and then seek such confirmation. In an instance the user indicates that the entry is incorrect, the system may be configured to repeat one or more steps herein to obtain the correct entry value. In some embodiments, the confirmation request may be a confirmation of multiple entries (e.g., a confirmation that the form is complete and accurate upon completely filling in the form). The confirmation request may be a request for an electric signature.

Referring now to Block 970 of FIG. 9, the method includes displaying, via a channel, to the user the form in an appropriate channel format. The confirmation request discussed above may be transmitted to the user with or after the form is displayed to the user (e.g., the system may provide the user with the completed form and ask for a confirmation, such as an electric signature, that the form is correct).

FIG. 11 illustrates a high level process flow of the cross-channel digital forms integration and presentation system interactions and structured storage, in accordance with one embodiment of the invention. As previously discussed with regard to FIG. 3, the cross-channel form integration server 206 may accept forms from one or more entities for user input. These forms may include Form 1 302, Form 2 304, Form 3 306, and Form 4 308. One will appreciate that while only four forms are illustrated in FIG. 3, there may be many more forms associated with the system. Each form may have a flow and a data associated with it. The flow may be the visual aspects of the form, such as the coloring, font, type, font size, branding elements, form structure or placement of fields, form labeling, form page size, page orientation, or the like. The data may include specific questions the form contains that the user must provide answers to in order to complete the form.

The cross-channel form integration server 206 may provide the data for each form in a specific parsed out order to each channel. As illustrated in FIG. 3 and FIG. 11, the mobile-based channel 310 and the web-based channel 314 are shown. While only two channels are illustrated, one of skill in the art will appreciate that several other channels may be available for a user to access a form. As illustrated, each channel has a pre-stored UI template as provided by the cross-channel form integration server 206. The mobile-based channel 310 has mobile UI templates 312 and the web-based channel 314 has UI templates 316. These templates comprise the font, color, format, and the like associated with the channel. The cross-channel form integration server 206 provides the data from the various forms in a specific order to the channel for user display via the channel.

After the user provides one or more responses via the respective channel, such as the mobile based channel 310, web based channel 314, or the like, the cross-channel form integration server 206 will perform a document generation, as indicated by the document generation step 1101. Document generation 1101 comprises generating a "completed" viewable form with the user input placed according to a form style template (while the completed form ideally contains all the necessary information provided by the user, the user may choose to generate a preview of the form before completing the all of the responses in the UI template in some embodiments; therefore, "completed" form is a term used to describe the form as completed by the user at the time of document generation 1101, and may not fully represent a truly completed form, but rather a preview of the stylized form based on user-provided responses at the time the preview is requested). The completed form may be generated in any number of formats, but is generally preferred in a PDF format to prevent further editing by the user outside of the channel-specific UI template. The document generation 1101 step may be utilized more than one time during the process of the user completing the UI template. For instance, the user may generate a preview of the completed form and revisit the UI template at a later time to provide more required information. As such, the cross-channel form integration server 206 may store one or more versions of the generated form document, and may label these versions intelligently to indicate when the form is truly completed or still in draft.

As further shown in FIG. 11, the cross-channel form integration server 206 also stores the user responses provided via each respective channel in a structured data storage 1102. In some embodiments this may be achieved through the use of a separate database file for each unique user, such as an ".xml" format, or the like. Storage of the user responses in the structured data storage 1102 may include encryption at rest or while data is in transit, and may also include one or more obfuscation techniques and tiered access-privilege schemes in order to ensure that the user responses, which may contain sensitive personally identifiable information (PII), is not accessed by any users that are not authorized to view the information. As shown in FIG. 11, systems or users who maintain necessary privileges to access and use the information in the structured data storage 1102 may access this information via the entity form systems 210. In other embodiments, the cross-channel form integration server 206 may re-access user responses stored in structured data storage 1102 in order to pre-populate one or more forms during the process of a user later filling out another UI template, using any given channel. In this way, the user responses stored in the structured data storage 1102 may be securely stored for later use in other business streams, or used to later pre-populate additional forms that require the same information to save the user time in filling out additional forms.

Finally, as shown in block 1103, the cross-channel form integration server 206 may also invoke a signature process after document generation 1101. This step refers to a separate electronic signature (e-signature) process that may include the invocation of one or more additional secure software programs designed to provide a secure e-signature from one or more parties (e.g., a tokenized signature including a time stamp, certification code, or the like). In this way, any document generated at document generation step 1101 may be automatically forwarded by the cross-channel form integration server 206 to the invoke signature process 1103, which is tasked with contacting the user for e-signature. The e-signature process, in preferred embodiments, will utilize the same channel of communication as was used by the user to complete the UI template, and as such, the instructions sent from the cross-channel form integration server 206 to the invoke signature process 1103 will be intelligently tailored to the channel of communication that was used to complete the UI template.

However, in some embodiments, the user may receive a link to complete the e-signature via a separate channel of communication, such as via email, text, or the like. In other embodiments, the same channel of communication that the user utilized to complete the UI template will automatically display an option to complete the e-signature process contemporaneously with presenting the generated form document. After receiving the generated document, completing the e-signature process, or both, the user may be given the option to download or save a local copy of the completed form for their records, and a copy will be automatically stored on the cross-channel form integration server 206 or entity form systems 210.

FIG. 12 illustrates a high level process flow of the cross-channel digital forms integration and presentation server for real-time datalink via multiple channels, in accordance with one embodiment of the invention. As previously discussed with regard to FIG. 3, the cross-channel form integration server 206 may accept forms from one or more entities, such as entity form systems 210, for user input. These forms may include Form 1 302, Form 2 304, Form 3 306, and Form 4 308. One will appreciate that while only four forms are illustrated in FIG. 3, there may be many more forms associated with the system. Each form may have a flow and a data associated with it. The flow may be the visual aspects of the form, such as the coloring, font, type, font size, branding elements, form structure or placement of fields, form labeling, form page size, page orientation, or the like. The data may include specific questions the form contains that the user must provide answers to in order to complete the form.

The cross-channel form integration server 206 may provide the data for each form in a specific parsed out order to each channel. As illustrated in FIG. 3 and FIG. 12, the mobile-based channel 310 and the web-based channel 314 are shown. While only two channels are illustrated, one of skill in the art will appreciate that several other channels may be available for a user to access a form, and the delivery and management of these forms may dynamically respond to the end-user channel being used to interact with the cross-channel form integration server 206. Each channel may have a pre-stored UI template as provided by the cross-channel form integration server 206. Furthermore, the cross-channel form integration server 206 may adapt not only to the channel of the end-user, but also the requirements of the form being crated on the entity-side of the process flow. As represented in block 1201, the cross-channel form integration server 206 may trigger creation and generation or processing of each form required by the user 202 according to one or more line of business application(s) 1202. For instance, if a particular line of business that the user 202 is associated with necessitate certain fields of information from a customer or client of the entity, the cross-channel form integration server 206 may reference one or more line of business application(s) 1202 in order to retrieve necessary input functions for creation of the form (e.g., a user 202 tasked with collecting estate transfer information may require one or more certificates of ownership, transfer of ownership, or the like, as indicated by an estate planning line of business application).

As further indicated in block 1203, the cross-channel form integration server 206 also includes a two-way form delivery and data management application. In some embodiments, the two-way form delivery and data management application 1203 is tasked with compiling and directing data between the entity form systems 210 and the various channels where the client or customer input their information. It is understood that the two-way form delivery and data management application 1203 allows the user 202 to push real-time tasks to the customer or client of the entity in order for the customer or client to complete documents or forms and provide the completed forms back to the entity form systems 210 in real-time.

As indicated in FIG. 12, the real-time datalink between the two-way form delivery and data management application 1203 and entity form systems 210 allows the user 202 to see updated information in required forms which are generated via the cross-channel form integration server 206. In some embodiments, this "fast-track" mechanism allows the user 202 to populate a task list for a customer or client of the entity with one or more forms that are generated during a contemporaneous communication with the client or customer. For instance, in some embodiments, the user 202 may be a customer service representative assisting a customer or client of the entity with an estate transfer, and may require the customer or client to complete one or more forms in order to certify ownership over some transferred resources from a relative. The user 202 may instruct form trigger and processing 1201 to generate a form according to a particular line of business application 1202. The generated form may be instantly viewable via the mobile based channel 310 or the web based channel 314 such that the customer or client can view the form and required fields, document upload requests, or the like via an application dashboard on their user device. As the customer or client inputs the required information or uploads the requested documents, the two-way form delivery and data management application 1203 may update a dashboard of the user 202 on the entity form systems 210 via the real-time datalink.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross channel digital data archiving and utilization, the system comprising:
a memory device with computer-readable program code stored thereon;
a communication device;
a processing device operatively coupled to the memory device and the communication device, wherein the processing device is configured to execute the computer-readable program code to:
receive a request from a first user device for a form creation;
based on the request, determine one or more required data input fields to complete the form creation, generating a form with one or more user response fields;
identify a screen identification, wherein the screen identification maps screen data into a data format;
determine a key for mapping data and a user interface (UI) template identifier associated with collecting the data based on an action to be performed by the user;
execute an enable action to define an action type for the action to be performed by the user and provide an array of UI identifiers as strings for enabling;
execute an enable action to define an action type for the action to be performed by the user and provide an array of UI identifiers as strings that require enabling
display, via a second user device, a pending task to complete the form;
extract the one or more user response fields from the form, wherein the one or more user response fields comprise one or more entries to be completed on the form;
generate one or more user prompts to be presented to the user in order to complete at least one of the one or more entries of the one or more user response fields;
cause transmission of at least one of the one or more user prompts to the user;
receive one or more prompt responses from the user based on at least one of the one or more user prompts;
in an instance in which the one or more prompt responses fails to meet one or more form requirements for the one or more entries, cause an additional rendering of one or more additional user prompts;
in an instance in which the additional rendering is caused, receive an additional prompt response from the user based on the additional rendering of one or more additional user prompts, wherein the additional prompt response from the user comprises verbal responses;
upon determination that the additional prompt response meets one or more form requirements for the one or more entries, update the form, wherein updating the form comprises completing the one or more entries based on the additional prompt response;
generate a completed form based on the one or more prompt responses and the additional prompt response;
transmit a confirmation request to the user to confirm the user to confirm the one or more prompt responses and the additional prompt response, wherein the confirmation request comprises an electronic signature;
store the one or more prompt responses in a structured data storage accessible by one or more systems;
access the structured data storage and using a unique user-based file to pre-populate one or more additional forms requiring same information from the user; and
transmit, via a real-time datalink, a completed form reflecting the one or more prompt responses to a dashboard of the first user device.

2. The system of claim 1, wherein the completed form is generated as a portable document format (PDF) file.

3. The system of claim 2, wherein the PDF file is transmitted to the user via the same channel of communication as is used to transmit the one or more user prompts.

4. The system of claim 1, wherein transmitting, via the real-time datalink, the complete form is completed using a separate two-way form delivery and management application linking the first user device and the second user device.

5. The system of claim 1, further comprising:
displaying an option to securely e-sign the completed form;
invoking a separate program to complete the e-sign process; and
transmitting instructions to the separate program to complete the e-sign process using the same channel of communication as is used to transmit the one or more user prompts.

6. A computer program product for cross channel digital data archiving and utilization with at least one non-transitory computer-readable medium having computer-readable program code portions embodied therein, the computer-readable program code portions comprising:
an executable portion configured to extract one or more data input fields from a form, wherein the one or more data input fields comprise one or more entries to be completed on the form;
an executable portion configured to receive a request from a first user device for a form creation;
an executable portion configured to, based on the request, determine one or more required data input fields to complete the form creation, generating a form with one or more user response fields;
an executable portion configured to identify a screen identification, wherein the screen identification maps screen data into a data format;
an executable portion configured to determine a key for mapping data and a user interface (UI) template identifier associated with collecting the data based on an action to be performed by the user;
an executable portion configured to execute an enable action to define an action type for the action to be performed by the user and provide an array of UI identifiers as strings for enabling;
an executable portion configured to execute an enable action to define an action type for the action to be performed by the user and provide an array of UI identifiers as strings that require enabling;
an executable portion configured to display, via a second user device, a pending task to complete the form;
an executable portion configured to extract the one or more user response fields from the form, wherein the one or more user response fields comprise one or more entries to be completed on the form;
an executable portion configured to generate one or more user prompts to be presented to a user in order to complete at least one of the one or more entries of the one or more user response fields;
an executable portion configured to cause transmission of at least one of the one or more user prompts to the user;
an executable portion configured to receive one or more prompt responses from the user based on at least one of the one or more user prompts;
an executable portion configured to, in an instance in which the one or more prompt responses fails to meet one or more form requirements for the one or more entries, cause an additional rendering of one or more additional user prompts;
an executable portion configured to, in an instance in which the additional rendering is caused, receive an additional prompt response from the user based on the additional rendering of one or more additional user prompts, wherein the additional prompt response from the user comprises verbal responses;
an executable portion configured to, upon determination that the additional prompt response meets one or more form requirements for the one or more entries, update the form, wherein updating the form comprises completing the one or more entries based on the additional prompt response;
an executable portion configured to generate a completed form based on the one or more prompt responses and the additional prompt response;
an executable portion configured to transmit a confirmation request to the user to confirm the user to confirm the one or more prompt responses and the additional prompt response, wherein the confirmation request comprises an electronic signature;
an executable portion configured to store the one or more prompt responses in a structured data storage accessible by one or more systems;
an executable portion configured to access the structured data storage and using a unique user-based file to pre-populate one or more additional forms requiring same information from the user; and
an executable portion configured to transmit, via a real-time datalink, a completed form reflecting the one or more prompt responses to a dashboard of the first user device.

7. The computer program product of claim 6, wherein the completed form is generated as a portable document format (PDF) file.

8. The computer program product of claim 7, wherein the PDF file is transmitted to the user via the same channel of communication as is used to transmit the one or more user prompts.

9. The computer program product of claim 6, wherein transmitting, via the real-time datalink, the complete form is completed using a separate two-way form delivery and management application linking the first user device and the second user device.

10. The computer program product of claim 6, further comprising:
displaying an option to securely e-sign the completed form;
invoking a separate program to complete the e-sign process; and
transmitting instructions to the separate program to complete the e-sign process using the same channel of communication as is used to transmit the one or more user prompts.

11. A computer-implemented method for cross channel digital data archiving and utilization, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving a request from a first user device for a form creation;
based on the request, determining one or more required data input fields to complete the form creation, generating a form with one or more user response fields;
identifying a screen identification, wherein the screen identification maps screen data into a data format;
determining a key for mapping data and a user interface (UI) template identifier associated with collecting the data based on an action to be performed by the user;
executing an enable action to define an action type for the action to be performed by the user and provide an array of UI identifiers as strings for enabling;
executing an enable action to define an action type for the action to be performed by the user and provide an array of UI identifiers as strings that require enabling;
displaying, via a second user device, a pending task to complete the form;
extracting the one or more user response fields from the form, wherein the one or more user response fields comprise one or more entries to be completed on the form;
generating one or more user prompts to be presented to the user in order to complete at least one of the one or more entries of the one or more user response fields;
causing transmission of at least one of the one or more user prompts to the user;
receiving one or more prompt responses from the user based on at least one of the one or more user prompts;
in an instance in which the one or more prompt responses fails to meet one or more form requirements for the one or more entries, causing an additional rendering of one or more additional user prompts;
in an instance in which the additional rendering is caused, receiving an additional prompt response from the user based on the additional rendering of one or more additional user prompts, wherein the additional prompt response from the user comprises verbal responses;
upon determination that the additional prompt response meets one or more form requirements for the one or more entries, update the form, wherein updating the form comprises completing the one or more entries based on the additional prompt response;
generating a completed form based on the one or more prompt responses and the additional prompt response;
transmitting a confirmation request to the user to confirm the user to confirm the one or more prompt responses and the additional prompt response, wherein the confirmation request comprises an electronic signature;

storing the one or more prompt responses in a structured data storage accessible by one or more systems;

accessing the structured data storage and using a unique user-based file to pre-populate one or more additional forms requiring same information from the user; and transmitting, via a real-time datalink, a completed form reflecting the one or more prompt responses to a dashboard of the first user device.

12. The method of claim 11, wherein the completed form is generated as a portable document format (PDF) file.

13. The method of claim 12, wherein the PDF file is transmitted to the user via the same channel of communication as is used to transmit the one or more user prompts.

14. The method of claim 11, further comprising:
displaying an option to securely e-sign the completed form;
invoking a separate program to complete the e-sign process; and
transmitting instructions to the separate program to complete the e-sign process using the same channel of communication as is used to transmit the one or more user prompts.

15. The method of claim 11, further comprising:
in an instance in which the prompt response fails to meet one or more form requirements for a given entry, causing an additional rendering of one or more of the at least one of the user prompts to a centralized user interface;
in an instance in which the additional rendering is caused, receiving an additional prompt response from the user based on the additional rendering to the centralized user interface; and
upon determination that the additional prompt response meets one or more form requirements for the given entry, updating the form, wherein updating the form comprises completing the given entry based on the additional prompt response.

* * * * *